(12) United States Patent
Anvari

(10) Patent No.: US 8,503,515 B2
(45) Date of Patent: Aug. 6, 2013

(54) HIGH SPEED SWITCH WITH DATA CONVERTER PHYSICAL PORTS AND PROCESSING UNIT

(75) Inventor: Kiomars Anvari, Alamo, CA (US)

(73) Assignee: Integrated Device Technology Inc., San Jose, CA (US)

(*) Notice: Subject to any disclaimer, the term of this patent is extended or adjusted under 35 U.S.C. 154(b) by 382 days.

(21) Appl. No.: 12/814,244

(22) Filed: Jun. 11, 2010

(65) Prior Publication Data
US 2011/0170619 A1 Jul. 14, 2011

Related U.S. Application Data

(63) Continuation-in-part of application No. 12/687,821, filed on Jan. 14, 2010.

(51) Int. Cl.
*H04B 1/38* (2006.01)

(52) U.S. Cl.
USPC .......... 375/219; 375/220; 375/222; 375/259; 375/295; 375/316; 455/39; 455/73; 455/91; 455/130; 370/272; 370/273; 370/275; 370/276; 370/278; 370/297; 370/352; 370/353; 370/354; 370/355; 370/356; 370/357; 370/358; 370/359; 370/360; 341/126; 341/144; 341/146; 341/155; 341/159

(58) Field of Classification Search
USPC ................. 375/219, 220, 222, 259, 295, 316; 455/39, 73, 91, 130; 370/272, 273, 275, 370/276, 278, 297, 352–360, 366; 341/126, 341/144, 146, 155, 159
See application file for complete search history.

(56) References Cited

U.S. PATENT DOCUMENTS

| | | | |
|---|---|---|---|
| 6,700,886 B2 | 3/2004 | Mullaney et al. | |
| 6,721,313 B1 | 4/2004 | Van Duyne | |
| 6,995,594 B2* | 2/2006 | Buchwald et al. | 327/248 |
| 2006/0107154 A1 | 5/2006 | Bansal et al. | |
| 2011/0122011 A1* | 5/2011 | Ryden et al. | 342/14 |

* cited by examiner

Primary Examiner — Leon Flores
(74) Attorney, Agent, or Firm — Bever Hoffman & Harms

(57) ABSTRACT

An integrated circuit chip implements a high-speed switch that includes: a switch fabric; control logic that controls the transmission of digital signals through the switch fabric; a transceiver block comprising one or more transceivers, each transmitting digital signals between the control logic and a corresponding external device; a data converter physical interface comprising one or more data converters, each performing a conversion between analog and digital signals, wherein digital signals associated with the one or more data converters are routed through the switch fabric; and a signal processing engine coupled to the control logic, wherein the signal processing engine performs on-chip processing of digital signals received from the transceiver block and the data converter physical interface.

33 Claims, 3 Drawing Sheets

HIGH SPEED SWITCH WITH DATA CONVERTER PHYSICAL PORTS AND PROCESSING UNIT

CROSS-REFERENCE TO RELATED APPLICATIONS

The present application is a continuation-in-part of U.S. patent application Ser. No. 12/687,821 filed Jan. 14, 2010, and entitled "High Speed Switch With Data Converter Physical Ports".

FIELD OF THE INVENTION

The present invention relates to a high speed switch that includes data converter physical ports that boost performance by providing flexibility, programmability, security and reliability.

RELATED ART

High speed switches and routers typically include a plurality of physical ports, each of which includes a corresponding digital transceiver. Each digital transceiver is capable of receiving a stream of serial digital input data from an external device. Upon receiving serial digital input data, the digital transceiver converts the serial digital input data into parallel digital data using a serializer-deserializer (SERDES) circuit. This parallel digital data is provided to a control circuit, which controls the routing of the parallel digital data in accordance with a particular protocol. In general, the control circuit causes the parallel digital data to be routed through a switch fabric to another physical port of the switch. The digital transceiver associated with this physical port converts the parallel digital data into a stream of serial digital output data, which is provided to an external device.

As described above, conventional high-speed switches typically operate exclusively in response to digital input and output signals. It would be desirable to have a high-speed switch that has the flexibility to operate in response to analog signals as well as digital signals.

SUMMARY

Accordingly, the present invention provides an improved communication system that implements a high-speed switch that includes both high-speed serial physical ports and high-speed data converter physical ports that operate in conjunction with intelligent protocols. As defined herein, intelligent protocols have features to manage signal latency, control and routing through the switch.

A first set of data converter physical ports may perform analog-to-digital conversions, such that an external analog signal may be converted to a digital input signal on the switch. The converted digital input signal may then be routed through the switch fabric to the serial physical ports or other data converter physical ports, in accordance with a serial data protocol. A second set of data converter physical ports may perform digital-to-analog conversions, such that an internal digital signal received from the switch fabric (and originating from the serial physical ports or other data converter physical ports) may be converted to an analog output signal on the switch, in accordance with a serial protocol. The converted analog output signal may then be transmitted to an external destination.

The high-speed switch can be used to implement a base station radio card. In this embodiment, a serial physical port of the high-speed switch receives digital baseband and control signals from a baseband card. The high-speed switch routes the received digital baseband and control signals to a signal processing block (through another serial physical port of the high-speed switch). In response, the signal processing block provides a digital baseband output signal, which is routed through the high-speed switch to a data converter physical port that performs digital-to-analog conversions. This data converter physical port converts the received digital baseband output signal to an analog output signal, which can be transmitted externally using a wired or wireless system. In an alternate embodiment, the high-speed switch can route the digital baseband signal provided by the baseband card directly to the data converter physical port that performs the digital-to-analog conversion (bypassing the signal processing block).

An external receiver circuit can be configured to receive an analog input signal, which is transmitted externally on a wired or wireless system. The external receiver circuit provides the analog input signal to a data converter physical port of the switch that performs analog-to-digital conversions. This data converter physical port converts the received analog input signal to a digital input signal, which is routed through the high-speed switch to the signal processing block (via a serial physical port of the switch). The signal processing block processes the digital input signal, and then forwards this processed digital input signal to the baseband card (through the high-speed switch). Alternately, the digital input signal can be routed through the high-speed switch directly to the baseband card.

In another embodiment, the digital input signal can be routed from the data converter physical port to a serial physical port of the switch. The serial physical port converts the digital input signal into a serial data output signal, which is transmitted to an external device coupled to the serial physical port.

In accordance with another embodiment of the present invention, an integrated circuit chip implements a high-speed switch. The integrated circuit chip includes a switch fabric, control logic, a transceiver block, a data converter physical interface and a processing block. The control logic controls the transmission of digital signals through the switch fabric. The transceiver block includes one or more transceivers, each transmitting digital signals between the control logic and a corresponding external device. The data converter physical interface includes one or more data converters, each performing a conversion between analog and digital signals, wherein digital signals associated with the one or more data converters are routed through the switch fabric. The processing block is coupled to the control logic, and performs on-chip processing of digital signals received from the transceiver block and the data converter physical interface.

The processing block may also control off-chip circuitry coupled to the data converter physical interface in response to digital signals received from the transceiver block. This off-chip circuitry may include, for example, an analog receiver or transmitter circuit. This off-chip circuitry may also include a redundancy circuit, which replaces a defective analog receiver or transmitter circuit.

A remote device, external to the integrated circuit chip, may be coupled to one of the transceivers of the transceiver block, wherein digital signals received from the data converter physical interface (or another one of the transceivers of the transceiver block) are transmitted to the remote device for monitoring. The digital signals may be transmitted during predetermined time windows, or on demand (in response to requests transmitted from the remote device).

The invention will be better understood by reference to the following detailed description in conjunction with the accompanying drawings.

DETAILED DESCRIPTION

Figure 1:
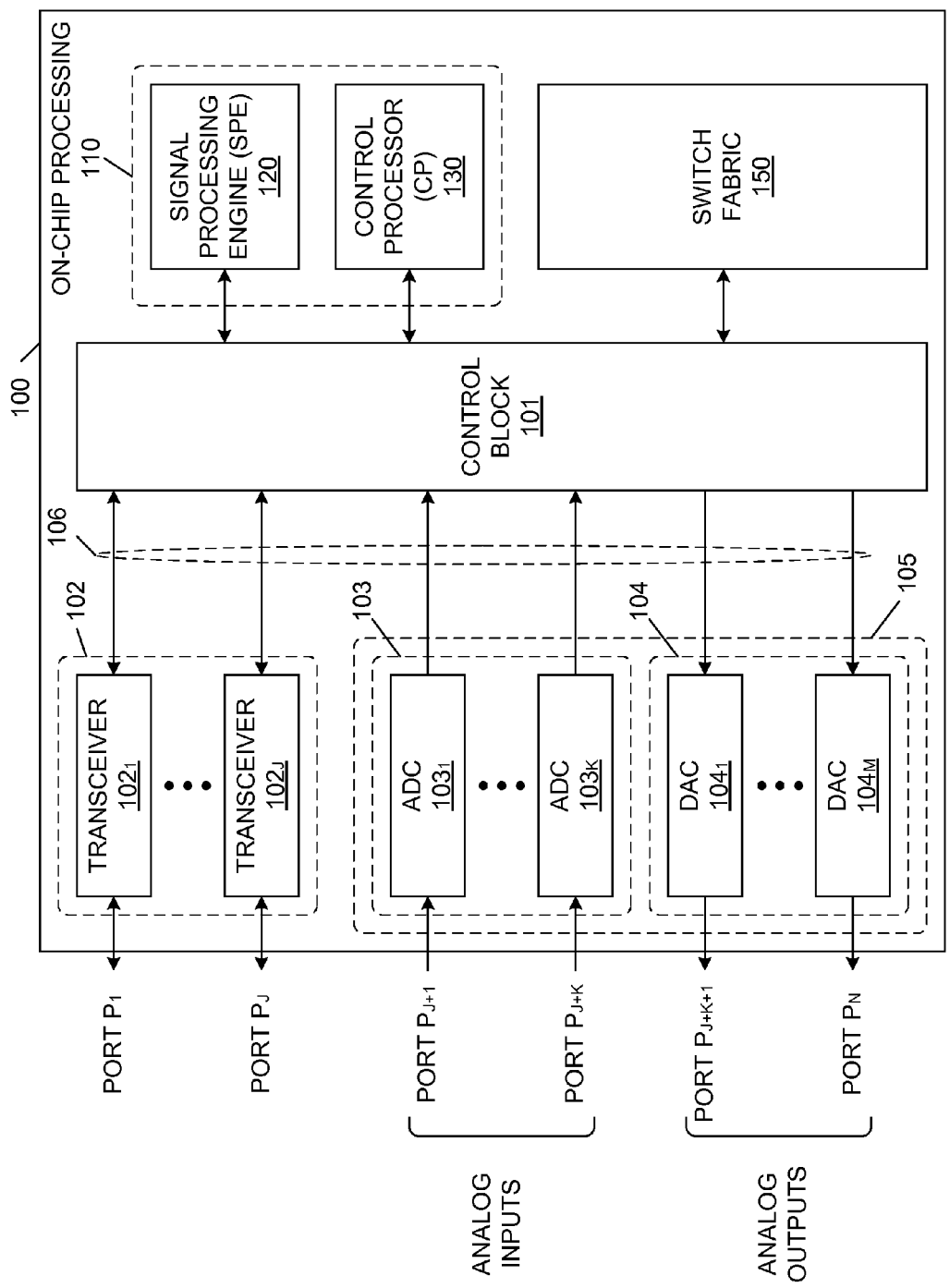
FIG. 1 is a block diagram of a multi-port switch in accordance with one embodiment of the present invention.

FIG. 1 is a block diagram of a high-speed switch 100, which includes high-speed serial physical ports $P_1$-$P_N$. Switch 100 includes the following main functional blocks: control logic block 101, transceiver block 102, data converter block 105, on-chip processing block 110 and switch fabric 150. Data converter block 105 includes analog-to-digital (A/D) physical interface 103 and digital-to-analog (D/A) physical interface 104. In the described embodiments, high-speed switch 100 is fabricated on a single integrated circuit (IC) chip.

As described in more detail below, control logic block 101 and physical ports $P_1$-$P_N$ support one or more serial data protocols, which may include (but are not limited to), the following: serial rapid input/output (SRio) protocol, Ethernet protocol, PCI Express (PCIe) protocol, Common Public Radio Interface (CPRI) protocol, and Joint Electron Device Engineering Council (JEDEC) data converter protocol.

The transceiver block 102 includes "J" transceivers $102_1$-$102_J$, each of which can be assigned to an interface port individually. Alternately, more than one of the transceivers $102_1$-$102_J$ can be bundled and assigned to one interface port. The transceivers $102_1$-$102_J$ convert serial digital data (both control and baseband data) received on ports $P_1$-$P_J$ into parallel digital data, which is transmitted on parallel bus system 106. The transceiver block 102 is bi-directional and converts parallel digital data received from switch fabric 150 (via control block 101) into high-speed serial digital data, which is transmitted to serial ports $P_1$-$P_J$. The transceivers $102_1$-$102_J$ in transceiver block 102 transmit and receive digital signals on the corresponding physical ports $P_1$-$P_J$ simultaneously. That is, transceivers $102_1$-$102_J$ may receive input signals on physical ports $P_1$-$P_J$, respectively, and at the same time, transmit output signals on these same physical ports $P_1$-$P_J$. The transceivers $102_1$-$102_J$ are configured to operate in accordance with one or more serial protocols.

The A/D physical interface 103 includes "K" analog-to-digital converters (ADCs) $103_1$-$103_K$. ADCs $103_1$-$103_K$ convert analog input signals received on the respective ports $P_{J+1}$-$P_{J+K}$ into L-bit digital baseband signals (wherein "L" is greater than one). The digital baseband signals provided by ADCs $103_1$-$103_K$ are provided to control block 101, and are routed through switch fabric 150. As described in more detail below, the analog input signals received on ports $P_{J+1}$-$P_{J+K}$ may be provided, for example, by the outputs of radio frequency receivers.

The D/A physical interface 104 includes "M" digital-to-analog converters (DACs) $104_1$-$104_M$. DACs $104_1$-$104_M$ convert L-bit digital baseband signals received from the switch fabric 150 (via control block 101) into analog output signals that are provided to ports $P_{J+K+1}$-$P_N$ (wherein N=J+K+M). As described in more detail below, the analog output signals provided on ports $P_{J+K+1}$-$P_N$ may be routed, for example, to radio frequency transmitters.

Control block 101 supports the one or more serial interface protocols (e.g., SRio, CPRI, PCIe, Ethernet and JEDEC), which are implemented within high-speed switch 100. Control block 101 also controls the routing function, which is implemented by switch fabric 150. Signals provided to control block 101 from ADCs $103_1$-$103_K$ may be routed to transceivers $102_1$-$102_J$ and DACs $104_1$-$104_M$. Signals provided to control block 101 from transceivers $102_1$-$102_J$ may be routed to transceivers $102_1$-$102_J$ and DACs $104_1$-$104_M$. The output signals transmitted from a particular physical port may have been originally received on the same physical port or on a different physical port.

On-chip processing block 110 includes signal processing engine (SPE) 120 and control processor (CP) 130 in the described embodiments. Signal processing engine 120 performs signal processing and control processor 130 performs control processing within high-speed switch 100. Because signal processing engine 120 and control processor 130 are located on-chip, these processors are capable of performing latency sensitive operations in a timely manner. Signal processing engine 120 and control processor 130 are capable of operating in various manners, which are described in more detail below. For example, control block 101 may route the digital baseband signals provided by ADCs $103_1$-$103_K$ (in response to the analog input signals received on ports $P_{J+1}$ to $P_{J+K}$) directly to signal processing engine 120 or control processor 130 for on-chip processing. After this processing is completed, the resulting digital signals are returned to control block 101, and may then be routed out of high-speed switch 100 through the serial transceivers $102_1$-$102_J$ for further processing. Control block 101 can also route signals received from the serial transceivers $102_1$-$102_J$ to signal processing engine 120 or control processor 130 for processing before being routed to DACs $104_1$-$104_M$ for transmission. Specific examples of the use of signal processing engine 120 and control processor 130 are described in more detail below in connection with FIG. 2.

Figure 2:
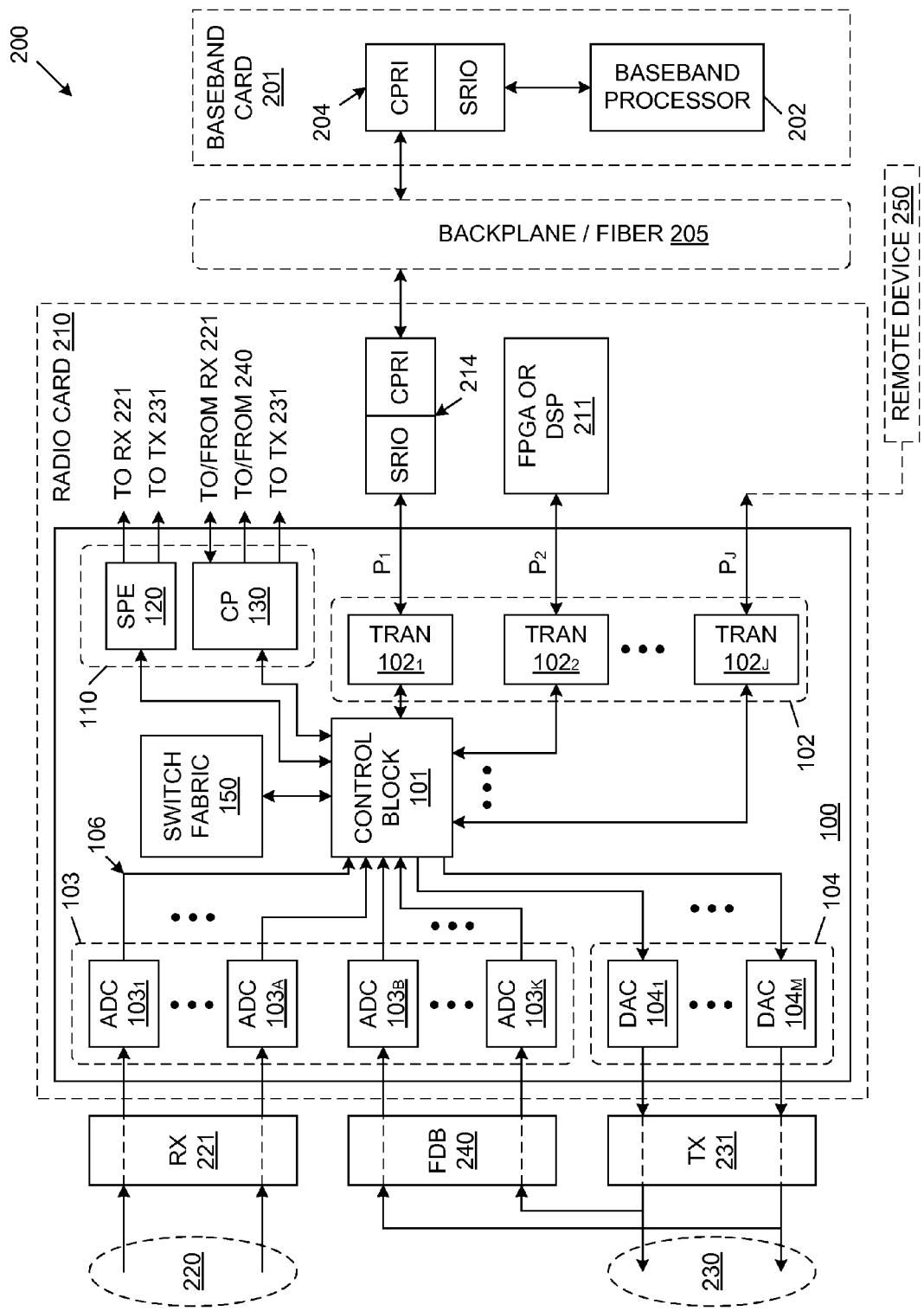
FIG. 2 is a block diagram of a communication system that uses the switch of FIG. 1 in accordance with one embodiment of the present invention.

FIG. 2 is a block diagram of a communication system 200 that implements the high-speed switch 100 in accordance with one embodiment of the present invention. Communication system 200 includes baseband card 201, a backplane or fiber connector 205, radio card 210, receiver medium 220, receiver circuits 221, transmitter medium 230, transmitter circuits 231, and feedback receiver circuits 240. Radio card 210 includes high-speed switch 100, field-programmable gate array (FPGA)/digital signal processor (DSP) 211 and backplane interface 214. In the described embodiments, high-speed switch 100 supports the SRio protocol (although other protocols are supported in other embodiments).

Baseband card 201 includes a baseband processor 202, which transmits digital baseband and control output signals in accordance with the SRio protocol to backplane interface 204. In response, backplane interface 204 performs an SRio-to-CPRI conversion, which allows the baseband and control signals to be transmitted to backplane/fiber connector 205 in accordance with the CPRI protocol. Note that backplane interface 204 also performs a CPRI-to-SRio conversion to allow CPRI protocol signals received from backplane/fiber connector 205 to be transmitted to baseband processor 202 in accordance with the SRio protocol.

The backplane interface 214 on radio card 210 operates in a manner similar to the backplane interface 204 on baseband card 201. That is, backplane interface 214 allows digital baseband and control signals to be transmitted to/from backplane/fiber connector 205 in accordance with the CPRI protocol, and allows digital baseband and control signals to be transmitted to/from high-speed switch 100 in accordance with the SRio protocol. The described embodiment implements the CPRI protocol over backplane/fiber connector 205, and the SRio protocol within high-speed switch 100 and processor 202. However, it is understood that these protocols are only exemplary, and that other serial protocols may be used in other embodiments. It is also understood that in yet another embodiment, a single serial protocol may be used to transfer information between processor 202 and high-speed switch 100 through the backplane/fiber connector 205. In yet another embodiment, baseband processor 202 may be located on radio card 210, and be coupled directly to a physical port (e.g., port $P_1$) of high-speed switch 100, thereby eliminating the need for baseband card 201, backplane/fiber connection 205 and backplane interfaces 204 and 214.

In the embodiment illustrated by FIG. 2, backplane interface 214 is coupled to transceiver $102_1$ of high-speed switch 100 via physical port $P_1$. In the described embodiments, transceiver $102_1$ is configured to implement the SRio protocol. However, in other embodiments, transceiver $102_1$ could be configured to implement another serial protocol, in order to match the serial protocol implemented by the baseband processor 202 on baseband card 201.

The baseband and control signals transmitted from baseband processor 202 enter the high-speed switch 100 through transceiver $102_1$, and are provided to control block 101. Note that transceiver $102_1$ performs a serial-to-parallel conversion of the received baseband and control signal. In accordance with one embodiment of the present invention, control block 101 may route these baseband and control signals in various manners, which are described in more detail below. For example, control block 101 may route the baseband and control signals received from baseband processor 202 through switch fabric 150, to transceiver $102_2$. Transceiver $102_2$ performs a parallel-to serial conversion of the received baseband and control signals. FPGA/DSP 211 of radio card 210 is coupled to transceiver $102_2$ via physical port $P_2$. As a result, the baseband and control signals received by transceiver $102_2$ are transmitted to FPGA/DSP 211. In the described embodiments, transceiver $102_2$ is configured to implement the SRio protocol. However, in other embodiments, transceiver $102_2$ could be configured to implement another serial protocol, in order to match the serial protocol implemented by FPGA/DSP 211.

FPGA/DSP 211 processes the received digital baseband signal to create a processed digital baseband signal, which is sent back to the high-speed switch 100 (via transceiver $102_2$), and is routed to D/A physical interface 104 (via control block 101 and switch fabric 150). Transceiver $102_2$ performs a serial-to-parallel conversion of the received digital baseband signal. Processing performed by FPGA/DSP 211 may include, but is not limited to, signal conditioning, filtering, and sample rate conversion. As described in more detail below, the processed (parallel) digital baseband signal is routed to D/A physical interface 104, and is converted to an analog output signal, which is transmitted from high-speed switch 100.

FPGA/DSP 211 also processes the received digital control signal to create a digital response signal, which is sent back to the high-speed switch 100 (via transceiver $102_2$), and is routed to baseband processor 202 (via control block 101, switch fabric 150, transceiver $102_1$, backplane interface 214, backplane/fiber connector 205 and backplane interface 204).

Control block 101 may alternately route the digital baseband signal received from baseband processor 202 through switch fabric 150, directly to D/A physical interface 104, without involving FPGA/DSP 211. It is also noted that the digital baseband and control signals transmitted from baseband processor 202 to high-speed switch 100 may alternately be routed to other transceivers $102_3$-$102_J$ in transceiver block 102, in a manner known by those skilled in the art.

Control block 101 may alternately route the digital baseband and control signals received from baseband processor 202 to signal processing engine 120. In this case, signal processing engine 120 performs local processing of the received digital baseband signal (in a manner similar to FPGA/DSP 211), thereby creating a processed digital baseband signal, which is routed to D/A physical interface 104 (via control block 101 and switch fabric 150).

In yet another example, control block 101 may route the digital baseband and control signals received from baseband processor 202 to signal processing engine 120 for initial processing. When this initial processing is complete, control block 101 routes the resulting processed baseband and control signals through switch fabric 150, to transceiver $102_2$ and FPGA/DSP 211. FPGA/DSP 211 performs further processing on the received digital baseband signal to create a processed digital baseband signal, which is sent back to the high-speed switch 100 (via transceiver $102_2$), and is routed to D/A physical interface 104 (via control block 101 and switch fabric 150).

Each of the DACs $104_1$-$104_M$ in D/A physical interface 104 is capable of receiving a processed (parallel) digital baseband signal from control block 101 (via switch fabric 150) in the various manners described above. The processed digital baseband signals received by DACs $104_1$-$104_M$ are converted into analog output signals, which are provided to transmitter circuits 231. Transmitter circuits 231 combine the analog output signals provided by DACs $104_1$-$104_M$ with corresponding radio-frequency (RF) carrier signals, thereby creating RF output signals, which are transmitted through transmitter medium 230. Transmitter medium 230 may include a transmitter antenna array that transmits the RF output signals wirelessly over the air. Alternately, transmitter medium 230 may include physical cables or twisted-pair conductors that transmit the RF output signals in a wired manner. The transmitted RF output signals are received at a remote location, and are processed to recreate the digital signals originally received by DACs $104_1$-$104_M$. The manner in which the RF output signals are processed to recreate the original digital signals is described in more detail below (in the description of the operation of receiver medium 220, receiver circuits 221 and ADCs $103_1$-$103_A$).

The digital baseband signals that are processed by high-speed switch 100 and are ultimately routed to D/A physical interface 104 in the manner described above, may also be routed in parallel to an external device (through transceiver block 102) for monitoring purposes. More specifically, control block 101 may route the processed digital baseband signals to both D/A physical interface 104 and to one (or more) of the transceivers $102_3$-$102_J$, in parallel. For example, control block 101 may route the processed digital baseband signals to both D/A physical interface 104 and transceiver $102_J$. Transceiver $102_J$, in turn, transmits the received digital baseband signals to remote monitoring device 250. Remote monitoring device 250 allows the signal integrity of the digital baseband signals to be remotely monitored in real-time (e.g., in an operations center). Transceiver $102_J$ may transmit the digital baseband signals to remote device 250 continuously, or during predetermined time windows. Alternately, transceiver $102_J$ may transmit the digital baseband signals in response to requests originating from remote device 250.

In yet another example, control block 101 may route the digital baseband and control signals received from baseband processor 202 to control processor 130. In response, control processor 130 may control various elements of communication system 200, which are external to high-speed switch 100. For example, control processor 130 may provide adjustments to receivers 221, transmitters 231 and/or feedback receiver circuits 240.

Receiver medium 220 receives radio-frequency (RF) input signals from external transmission sources (not shown). These RF input signals are similar to the RF output signals provided by transmitter circuits 231. Receiver medium 220 may include a receiver antenna array that receives RF input signals that are transmitted wirelessly over the air. Alternately, receiver medium 220 may include physical cables or twisted-pair conductors that receive the RF input signals in a wired manner. Receiver medium 220 provides the received RF input signals to receiver circuits 221. Receiver circuits 221 perform analog signal processing on the received RF input signals (e.g., filtering the RF carrier signals from the received RF input signals and conditioning the filtered signal) to create analog input signals, which are transmitted to corresponding ADCs $103_1$-$103_A$ of A/D physical interface 103. Each of the ADCs $103_1$-$103_A$ samples the corresponding analog input signal received from receiver circuits 221 in order to create a parallel digital input signal. The parallel digital input signals provided by ADCs $103_1$-$103_A$ are transmitted on parallel bus system 106 to control block 101.

Control block 101 is capable of routing the parallel digital baseband signals received from ADCs $103_1$-$103_A$ in various manners, as described in more detail below. For example, control block 101 may route the parallel digital baseband signals received from ADCs $103_1$-$103_A$ to FPGA/DSP 211 (via switch fabric 150 and transceiver $102_2$) for digital signal processing (e.g., conditioning, filtering, sample rate conversion, observe the integrity of the received signal). After performing the desired digital signal processing, FPGA/DSP 211 may transmit the resulting processed digital baseband signal to baseband processor 202 (via transceiver $102_2$, control block 101, switch fabric 150, transceiver $102_1$, backplane interface 214, backplane/fiber connector 205, and backplane interface 204). Alternately, FPGA/DSP 211 may transmit the resulting processed digital baseband signal to one (or more) of transceivers $102_3$-$102_J$, wherein the processed digital baseband signal is serialized, using a serial protocol, for transmission to other components that are connected to the switch 100.

In another example, the parallel digital baseband signals output from ADCs $103_1$-$103_A$ may be directly routed to baseband processor 202 (via control block 101, switch fabric 150, transceiver $102_1$, backplane interface 214, backplane/fiber connector 205, and backplane interface 204), without involving FPGA/DSP 211.

In another example, the parallel digital baseband signals output from ADCs $103_1$-$103_A$ may be routed to signal processing engine 120 (via control block 101) for on-chip digital signal processing. This on-chip processing may include, for example, monitoring the integrity of the digital baseband signals provided by ADCs $103_1$-$103_A$. After performing the desired digital signal processing, signal processing engine 120 may transmit the resulting processed digital baseband signal to baseband processor 202 (via control block 101, switch fabric 150, transceiver $102_1$, backplane interface 214, backplane/fiber connector 205, and backplane interface 204). Alternately, signal processing engine 120 may transmit the resulting processed digital baseband signal to FPGA/DSP 211 for further processing (via control block 101, switch fabric 150, and transceiver $102_2$). FPGA/DSP 211 may then transmit the resulting processed digital baseband signal to baseband processor 202 in the manner described above.

In accordance with one embodiment, signal processing engine 120 may transmit control signals that adjust the operating characteristics of receiver circuits 221, based on the processing results of the signals provided by ADCs $103_1$-$103_A$. For example, signal processing engine 120 may transmit a control signal that adjusts the signal level of receiver circuits 221 in response to the processing results, thereby optimizing the operation of ADCs $103_1$-$103_A$.

In yet another example, the parallel digital baseband signals output from ADCs $103_1$-$103_A$ may be routed to other transceivers $102_3$-$102_J$ (via control block 101 and switch fabric 150). These transceivers $102_3$-$102_J$ serialize the received parallel digital baseband signals (using a serial protocol), and transmit these serialized signals to other components that are connected to the switch.

In yet another example, control block 101 may route the parallel digital baseband signals output from ADCs $103_1$-$103_A$ to control processor 130. In response, control processor 130 may control various elements of communication system 200, which are external to high-speed switch 100. For example, control processor 130 may provide adjustments to receivers 221, transmitters 231 and/or feedback receiver circuits 240.

The digital baseband signals output from ADCs $103_1$-$103_A$ may also be routed in parallel to an external device (through transceiver block 102) for monitoring purposes. More specifically, control block 101 may route the digital baseband signals received from ADCs $103_1$-$103_A$ to broadband processor 202, signal processing engine 120, control processor 130 and/or FPGA/DSP 211 in the manner described above, and in parallel, route the same digital baseband signals to one (or more) of the transceivers $102_3$-$102_J$. For example, control block 101 may route the processed digital baseband signals received from ADCs $103_1$-$103_A$ to both broadband processor 202 and transceiver $102_J$. Transceiver $102_J$, in turn, transmits the received digital baseband signals to remote monitoring device 250. Remote monitoring device 250 allows the signal integrity of the digital baseband signals to be remotely monitored in real-time (e.g., in an operations center). Transceiver $102_J$ may transmit the digital baseband signals to remote device 250 continuously, or during predetermined time windows. Alternately, transceiver $102_J$ may transmit the digital baseband signals in response to requests originating from remote device 250. Note that the remote signal monitoring does not interfere with normal processing of the digital baseband signals.

In accordance with another embodiment of the present invention, the RF output signals provided by transmitter circuits 231 are also transmitted to feedback receiver circuits 240. Feedback receiver circuits 240 process the RF output signals in the same manner that receiver circuits 221 process the RF input signals. Feedback receiver circuits 240 provide the resulting analog input signals to ADCs $103_B$-$103_K$, which perform an analog-to-digital conversion in the same manner as ADCs $103_1$-$103_A$, thereby creating parallel digital baseband signals, which are transmitted to control block 101. Control block 101 causes the parallel digital baseband signals received from ADCs $103_B$-$103_K$ to be routed to signal processing engine 120, control processor 130 or FPGA/DSP 211.

The receiving processor (120, 130 or 211) compares the parallel digital baseband signals received from ADCs $103_B$-$103_K$ with the corresponding parallel digital baseband signals originally transmitted to DACs $104_1$-$104_M$, in order to observe the integrity of the signals transmitted from the transmitter circuits 231. The receiving processor (120, 130 or 211) may transmit the results of this comparison to baseband processor 202. The results of this comparison may be used to improve the integrity of signals subsequently transmitted from the transmitter circuits 231.

High-speed switch 100 introduces a significant amount of flexibility, programmability, security and reliability to radio card 210. In accordance with one embodiment, high speed switch 100 supports physical ports $P_1$-$P_N$ with different speeds and compatible protocols. In accordance with another embodiment, different physical ports $P_1$-$P_N$ of high-speed switch 100 may support different protocols.

Figure 3:
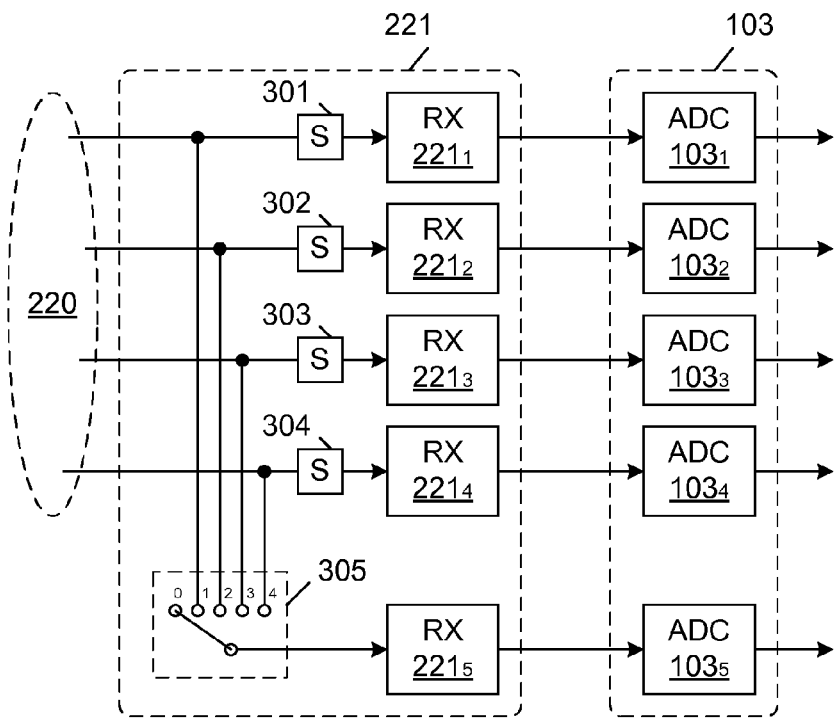
FIG. 3 is a block diagram illustrating the manner in which redundancy may be provided an analog-to-digital physical interface of the switch of FIG. 1 in accordance with one embodiment of the present invention.

In accordance with another embodiment, redundancy is provided by A/D physical interface 103 and/or D/A physical interface 104. FIG. 3 is a block diagram illustrating the manner in which redundancy may be provided by A/D physical interface 103 in accordance with one embodiment of the present invention. In this embodiment, A/D physical interface 103 includes ADCs $103_1$-$103_5$ (i.e., A=5). Receiver circuits 221 include individual receivers $221_1$-$221_5$, which are coupled to ADCs $103_1$-$103_5$, respectively. The inputs of receivers $221_1$-$221_4$ are coupled to receiver medium 220 by switches 301-304, respectively. The inputs to the individual receivers $221_1$-$221_4$ are also coupled to a redundancy switch 305.

In the illustrated example, redundancy switch 305 includes five positions 0-4, wherein position 0 is 'open', and positions 1-4 couple the input of receiver circuit $221_5$ to the input sources of receivers $221_1$-$221_4$, respectively. During normal operation, redundancy switch 305 is in position 0 (open), and switches 301-304 are closed, such that receivers $221_1$-$221_4$ provide analog input signals to ADCs $103_1$-$103_4$, respectively. Receiver $221_5$ and ADC $103_5$ are inactive during normal operating conditions. On-chip processing block 110 may detect that one of the receivers $221_1$-$221_4$ has become non-functional (i.e., no longer transmits analog signals to the associated ADC).

In this case, the on-chip processing block 110 will transmit a control signal to redundancy switch 305, thereby causing the input source of the non-functional receiver circuit to be applied to receiver circuit $221_5$. This control signal is also used to open the switch 301-304 associated with the non-functional receiver. For example, if on-chip processing block 110 determines that receiver circuit $221_1$ has become non-functional, then on-chip processing block 110 causes switch 301 to turn off, and further causes redundancy switch 305 to switch to position 1, such that the input signal previously provided to receiver $221_1$ is now provided to receiver $221_5$. High-speed switch 100 then uses the output of ADC $103_5$ in place of the output of ADC $103_1$.

Figure 4:
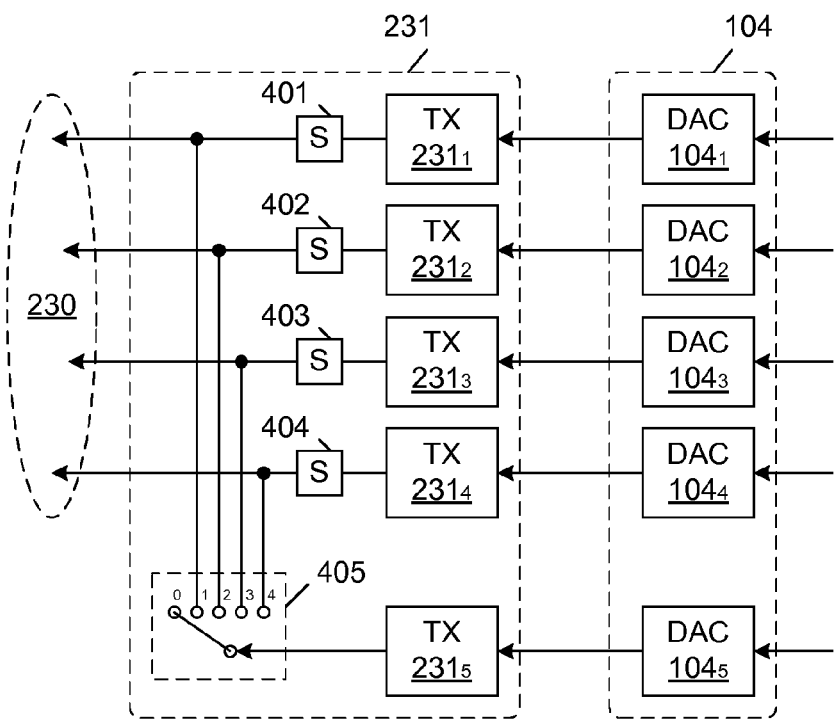
FIG. 4 is a block diagram illustrating the manner in which redundancy may be provided a digital-to-analog physical interface of the switch of FIG. 1 in accordance with one embodiment of the present invention.

FIG. 4 is a block diagram illustrating the manner in which redundancy may be provided by D/A physical interface 104 in accordance with one embodiment of the present invention. In this example, DACs $104_1$-$104_5$ are connected to individual transmitters $231_1$-$231_5$, respectively. The outputs of transmitters are coupled to switches 401-404, respectively. Redundancy switch 405 is coupled to the outputs of transmitters $231_1$-$231_5$ as illustrated. Redundancy switch 405 is a 5-position switch, similar to redundancy switch 305 (FIG. 3). If on-chip processing block 110 determines that one of the transmitters $231_1$-$231_4$ is defective, on-chip processing block 110 transmits a control signal that turns off the switch associated with the defective transmitter, and controls redundancy switch 405 to route the output of transmitter $231_5$ in place of the output of the defective transmitter. On-chip processing block 110 also configures control block 101 to route the digital output signals associated with the defective transmitter to DAC $104_5$. For example, if transmitter $231_2$ becomes defective, on-chip processor block 110 detects this state, and in response, sends a control signal to turn off switch 402, and change the configuration of redundancy switch 405 from position 0 to position 2. On-chip processing block 110 then configures control block 101 to route the associated digital output signals to DAC $104_5$, rather than DAC $104_2$.

Although the invention has been described in connection with several embodiments, it is understood that this invention is not limited to the embodiments disclosed, but is capable of various modifications, which would be apparent to one of ordinary skill in the art. For example, it is understood that communication system 200 can be used in any wireless or wired communication network, including, but not limited to, wireless cellular, Personal Communication System (PCS), wireless Local Area Network, Wireless Wide Area Network, WiMax, Video and Audio Wireless Broadcasting, line of sight microwave, military, optical, and satellite communication systems. It is also understood that in the communication system 200 of FIG. 2, additional peripheral devices could be connected to transceivers $102_3$-$102_J$, (i.e., physical ports $P_3$-$P_J$) thereby allowing these additional peripheral devices to communicate through high-speed switch 100. Thus, the present invention is only intended to be limited by the following claims.

I claim:

1. A communication system comprising:
   an integrated circuit chip that includes:
   a switch fabric;
   control logic that controls the transmission of digital signals through the switch fabric;
   a transceiver block comprising one or more transceivers, each transmitting digital signals between the control logic and a corresponding external device;
   a data converter physical interface comprising one or more data converters, each performing a conversion between analog and digital signals, wherein digital signals associated with the one or more data converters are routed through the switch fabric; and
   a signal processing engine coupled to the control logic, wherein the signal processing engine performs on-chip processing of digital signals received from the transceiver block and the data converter physical interface; and
   a remote device, external to the integrated circuit chip, wherein the remote device is coupled to one of the transceivers of the transceiver block, wherein digital signals transmitted to the data converter physical interface are transmitted to the remote device in parallel.

2. The communication system of claim 1, further comprising a control processor coupled to the control logic, wherein the control processor controls off-chip circuitry coupled to the data converter physical interface in response to digital signals received from the transceiver block.

3. The communication system of claim 2, wherein the off-chip circuitry comprises an analog receiver circuit, which is coupled to the data converter physical interface.

4. The communication system of claim 3, wherein the off-chip circuitry further comprises an analog transmitter circuit, which is coupled to the data converter physical interface.

5. The communication system of claim 1, wherein digital signals received from the data converter physical interface are transmitted to the remote device.

6. The communication system of claim 5, wherein the control logic transmits digital signals received from the data converter physical interface to the remote device during predetermined time windows.

7. The communication system of claim 5, wherein the control logic transmits digital signals received from the data converter physical interface to the remote device in response to requests generated by the remote device.

8. The communication system of claim 5, further comprising a baseband processor, external to the integrated circuit chip, wherein the baseband processor is coupled to one of the transceivers of the transceiver block, wherein digital signals received from the data converter physical interface are transmitted to both the remote device and the baseband processor in parallel.

9. The communication system of claim 1, wherein the digital signals are transmitted to the remote device during predetermined time windows.

10. The communication system of claim 1, wherein the digital signals are transmitted to the remote device in response to requests generated by the remote device.

11. The communication system of claim 1, further comprising: a plurality of analog signal processing circuits coupled to the data converter physical interface; and a redundancy circuit for replacing a defective one of the analog signal processing circuits, wherein the redundancy circuit is controlled by the signal processing engine.

12. The communication system of claim 1, wherein the data converter physical interface comprises an analog-to-digital (A/D) physical interface comprising one or more analog-to-digital converters (ADCs), each converting an analog input signal received from an external source into digital signals that are transmitted to the control logic and routed through the switch fabric.

13. The communication system of claim 1, wherein the data converter physical interface comprises a digital-to-analog (D/A) physical interface comprising one or more digital-to-analog converters (DACs), each converting digital signals received from the control logic into an analog output signal that is transmitted to a corresponding external destination.

14. A method of operating a switch in a communication system comprising:
receiving a serial data input signal on a first physical port of the switch;
converting the serial data input signal to a parallel data input signal at the first physical port of the switch, wherein the first physical port implements a serial data protocol;
routing the parallel data input signal to a processing unit of the switch, wherein the processing unit processes the parallel data input signal to provide a parallel data output signal;
routing the parallel data output signal through a switch fabric of the switch to a second physical port of the switch and a third physical port of the switch;
converting the parallel data output signal into a first serial data output signal at the second physical port of the switch;
converting the parallel data output signal into a second serial data output signal at the third physical port of the switch;
transmitting the second serial data output signal from the third physical port of the switch to an external device; and
monitoring the second serial data output signal with the external device.

15. The method of claim 14, further comprising performing an analog-to-digital conversion in the first physical port of the switch.

16. The method of claim 14, further comprising performing a digital-to-analog conversion in the second physical port of the switch.

17. The method of claim 14, further comprising transmitting the second serial data output signal from the third physical port of the switch to the external device in response to a request from the external device.

18. The method of claim 14, further comprising transmitting the second serial data output signal from the third physical port of the switch to the external device during predetermined time windows.

19. A method of operating a switch in a communication system comprising:
receiving a serial data input signal on a first physical port of the switch;
converting the serial data input signal to a parallel data input signal at the first physical port of the switch, wherein the first physical port implements a serial data protocol;
routing the parallel data input signal to a processing unit of the switch, wherein the processing unit processes the parallel data input signal to provide a parallel data output signal;
routing the parallel data output signal through a switch fabric of the switch to a second physical port of the switch;
converting the parallel data output signal into a serial data output signal at the second physical port of the switch, wherein the first and second physical ports, the processing unit and the switch fabric are located on the same integrated circuit chip;
generating a control signal with the processing unit in response to the parallel data input signal; and
using the control signal to adjust a receiver circuit coupled to the first physical port of the switch.

20. A method of operating a switch in a communication system comprising:
receiving a serial data input signal on a first physical port of the switch;
converting the serial data input signal to a parallel data input signal at the first physical port of the switch, wherein the first physical port implements a serial data protocol;
routing the parallel data input signal to a processing unit of the switch, wherein the processing unit processes the parallel data input signal to provide a parallel data output signal;
routing the parallel data output signal through a switch fabric of the switch to a second physical port of the switch;
converting the parallel data output signal into a serial data output signal at the second physical port of the switch, wherein the first and second physical ports, the processing unit and the switch fabric are located on the same integrated circuit chip;
generating a control signal with the processing unit in response to the parallel data input signal; and
using the control signal to adjust a transmitter circuit coupled to the second physical port of the switch.

21. A method of operating a switch in a communication system comprising:

receiving a serial data input signal on a first physical port of the switch;

converting the serial data input signal to a parallel data input signal at the first physical port of the switch, wherein the first physical port implements a serial data protocol;

routing the parallel data input signal to a processing unit of the switch, wherein the processing unit processes the parallel data input signal to provide a parallel data output signal;

routing the parallel data output signal through a switch fabric of the switch to a second physical port of the switch;

converting the parallel data output signal into a serial data output signal at the second physical port of the switch, wherein the first and second physical ports, the processing unit and the switch fabric are located on the same integrated circuit chip;

monitoring the parallel data input signal with the processing unit to determine whether the parallel data input signal is valid; and switching the serial data input signal from the first physical port to a third physical port upon determining that the parallel data input signal is not valid.

22. A method of operating a switch in a communication system comprising:

receiving a serial data input signal on a first physical port of the switch;

converting the serial data input signal to a parallel data input signal at the first physical port of the switch, wherein the first physical port implements a serial data protocol;

routing the parallel data input signal to a processing unit of the switch, wherein the processing unit processes the parallel data input signal to provide a parallel data output signal;

routing the parallel data output signal through a switch fabric of the switch to a second physical port of the switch;

converting the parallel data output signal into a serial data output signal at the second physical port of the switch, wherein the first and second physical ports, the processing unit and the switch fabric are located on the same integrated circuit chip;

monitoring the serial data output signal with the processing unit to determine whether the serial data output signal is valid; and switching the serial data output signal from the second physical port to a third physical port upon determining that the serial data output signal is not valid.

23. A communication system comprising:
an integrated circuit chip that includes:
a switch fabric;
control logic that controls the transmission of digital signals through the switch fabric;
a transceiver block comprising one or more transceivers, each transmitting digital signals between the control logic and a corresponding external device;
a data converter physical interface comprising one or more data converters, each performing a conversion between analog and digital signals, wherein digital signals associated with the one or more data converters are routed through the switch fabric; a signal processing engine coupled to the control logic, wherein the signal processing engine performs on-chip processing of digital signals received from the transceiver block and the data converter physical interface;

a remote device, external to the integrated circuit chip, wherein the remote device is coupled to one of the transceivers of the transceiver block, wherein digital signals received from the data converter physical interface are transmitted to the remote device; and a baseband processor, external to the integrated circuit chip, wherein the baseband processor is coupled to one of the transceivers of the transceiver block, wherein digital signals received from the data converter physical interface are transmitted to both the remote device and the baseband processor in parallel.

24. The communication system of claim 23, further comprising a control processor coupled to the control logic, wherein the control processor controls off-chip circuitry coupled to the data converter physical interface in response to digital signals received from the transceiver block.

25. The communication system of claim 24, wherein the off-chip circuitry comprises an analog receiver circuit, which is coupled to the data converter physical interface.

26. The communication system of claim 25, wherein the off-chip circuitry further comprises an analog transmitter circuit, which is coupled to the data converter physical interface.

27. The communication system of claim 23, wherein the control logic transmits digital signals received from the data converter physical interface to the remote device during predetermined time windows.

28. The communication system of claim 23, wherein the control logic transmits digital signals received from the data converter physical interface to the remote device in response to requests generated by the remote device.

29. The communication system of claim 23, wherein digital signals are transmitted to the remote device during predetermined time windows.

30. The communication system of claim 23, wherein digital signals are transmitted to the remote device in response to requests generated by the remote device.

31. The communication system of claim 23, further comprising:

a plurality of analog signal processing circuits coupled to the data converter physical interface; and a redundancy circuit for replacing a defective one of the analog signal processing circuits, wherein the redundancy circuit is controlled by the signal processing engine.

32. The communication system of claim 23, wherein the data converter physical interface comprises an analog-to-digital (A/D) physical interface comprising one or more analog-to-digital converters (ADCs), each converting an analog input signal received from an external source into digital signals that are transmitted to the control logic and routed through the switch fabric.

33. The communication system of claim 23, wherein the data converter physical interface comprises a digital-to-analog (D/A) physical interface comprising one or more digital-to-analog converters (DACs), each converting digital signals received from the control logic into an analog output signal that is transmitted to a corresponding external destination.

* * * * *